United States Patent

[11] 3,624,186

[72] Inventor Hideo Kubota
Roseville, Mich.
[21] Appl. No. 54,560
[22] Filed July 13, 1970
[45] Patented Nov. 30, 1971
[73] Assignee General Motors Corporation
Detroit, Mich.

[54] LUBRICANT FOR ABS AND SAN POLYMERS
5 Claims, No Drawings
[52] U.S. Cl. ........................................ 260/893,
260/876 R, 260/894, 264/211, 264/349
[51] Int. Cl. ........................................ C08f 29/56
[50] Field of Search ........................................ 260/893,
876, 894; 264/211, 349

[56] References Cited
FOREIGN PATENTS
1,024,778  4/1966  Great Britain ............... 260/893

Primary Examiner—Murray Tillman
Assistant Examiner—C. Seccuro
Attorneys—William S. Pettigrew and George A. Grove ABSTRACT: The extrusion or injection molding of ABS and SAN resin melts is aided by incorporating into the melt up to about 3 percent by weight of a stearate or palmitate ester of hydroxy terminated polybutadiene or a hydroxy terminated butadiene-acrylonitrile copolymer. The polymer ester functions as an excellent lubricant for shear processing in melts of ABS and SAN.

3,624,186

LUBRICANT FOR ABS AND SAN POLYMERS

This invention relates to the improved shear processing of acrylonitrile-butadine-styrene (ABS) and styrene-acrylonitrile copolymer (SAN) melts. More specifically, this invention relates to the incorporation of certain specific polymeric ester lubricants into ABS resins and SAN resins for imposed melt-forming operations.

It is well known that acrylonitrile-butadiene-styrene resins and styrene-acrylonitrile resins can be formed into useful articles of commerce by a number of different forming processes. In many instances these resins are heated until melted and then subjected to a shearing force, whereby they are extruded through a die or injected into a mold into the shape of a desired article. It is common practice to mix a lubricating material with these resins prior to or during the melting operation in connection with the forming operation. One of the functions of the lubricant is to reduce the melt viscosity of the resin so that it can be more readily extruded or injected into a mold. The lubricant may also serve to improve the surface quality of the formed article and act as a release agent when the article is removed from a mold. Commonly known lubricants for ABS resins and SAN resins include rosin and metal soaps, such as lead stearate, calcium stearate, barium stearate, cadmium stearate and zinc stearate.

It is an object of the present invention to provide an improved lubricant material for ABS resins and SAN resins which is particularly effective in reducing melt viscosity.

It is a further object of the present invention to provide a polymeric ester which is compatible with ABS resins and SAN resins and may be incorporated therein in small amounts to function as a lubricant in melt-forming operations.

In accordance with a preferred embodiment of my invention, these and other objects are accomplished by initially providing certain specific saturated straight chain fatty acid esters of hydroxy terminated polybutadiene or hydroxy terminated butadine-acrylonitrile copolymer. These hydroxy terminated polymers are commercially available. In accordance with my invention they are esterified by reaction with a suitable derivative of stearic acid or palmitic acid to form the respective fatty acid ester. These higher fatty acid esters of the hydroxy terminated polymers are particularly useful as lubricants in ABS resins and SAN resins when incorporated in small amounts up to about 3 percent by weight of the resin. The polymeric ester lubricants affect a marked reduction in the melt viscosity of the ABS and SAN polymers, particularly at relatively low shear rates from about 15 seconds$^{-1}$ to about 2,500 seconds$^{-1}$. The result is that the ABS and SAN resins have improved melt flow characteristics and the formed article has a smoother surface and is more readily released from a metallic mold or die.

Styrene-acrylonitrile copolymers are strong, tough materials which find wide application. Most of these commercial polymers contain about 24 percent or more by weight acrylonitrile and the balance styrene. They can be injection molded or extruded at temperatures in the range of 400° to 500° F. Styrene-acrylonitrile copolymers also constitute the rigid matrix phase of acrylonitrile-butadiene-styrene engineering thermoplastics. ABS plastics typically contain about 20 percent to 30 percent polybutadiene, balance styrene-acrylonitrile copolymer, and are well known for their toughness, hardness and durability. The dispersed elastomeric polybutadiene phase in the hard styrene-acrylonitrile matrix provides these desirable properties. ABS resins also may be readily extruded or injection molded. These operations may be accomplished at about 425° to 500° F. The polymeric esters of my invention are advantageously combined with either SAN copolymers or ABS resin melts for extrusion, injection molding or other melt shear forming operations.

Suitable lubricating polymeric esters, in accordance with my invention, comprise the stearate esters of hydroxy terminated polybutadiene and hydroxy terminated butadiene-acrylonitrile copolymer as well as the palmitate esters of the same hydroxy terminated polymers. Hydroxy terminated polybutadiene [HO(butadiene)$_n$OH] and hydroxy terminated butadiene-acrylonitrile [HO(butadiene-acrylonitrile)$_n$OH] are commercially available substances. The hydroxy terminated polybutadiene typically has a number average molecular weight in the range of about 8,000 to 11,000. A typical hydroxy terminated butadiene-acrylonitrile has a molecular weight of about 11,000. For use in my invention these polymeric materials are esterified with a suitable derivative of stearic acid or palmitic acid, such as the respective acid anhydride or acid chloride.

A few specific examples of preparation of the polymer ester lubricants and their use in ABS and SAN resins will further illustrate my invention.

EXAMPLE I

A solution of 116.4 grams of hydroxy terminated polybutadiene in 1,000 milliliters of dry benzene was prepared under nitrogen atmosphere at about the boiling point of the benzene. The hydroxy terminated polybutadiene was a commercial material having a molecular weight of about 9,500. When the polymer was completely dissolved, 23.2 grams of stearyl chloride spectroscopy added to the solution, followed by 4 milliliters of pyridine. The solution was heated at reflux for four hours. The pyridine-HCl precipitate was separated from the benzene solution by decantation. The benzene was partially evaporated from the solution and the residual solution was poured into cold methanol (−20° to about 0° C.) to precipitate the stearate esterified polymer. The esterified polymer was washed with a methanol-ether mixture several times at 0° C. and the polymer was then dried in vacuum. The resulting polymer was analyzed by infrared spectroscopy and it was determined that about 60 percent of the original terminal hydroxy groups had been esterified.

The blending of this material, polymeric ester No. 1, with SAN and ABS resins and the resulting processing will be described below after example III.

EXAMPLE II

A solution of 47.1 grams hydroxy terminated polybutadiene and 9.3 grams of stearyl anhydride in benzene was prepared under nitrogen atmosphere at the boiling point of the benzene. A trace amount of acrylyl chloride was added. The esterification reaction and subsequent isolation and purification of the polymer were carried out as in example I. The dried polymer was analyzed by infrared spectroscopy and it was found that about 70 percent of the terminal hydroxy groups had been esterified.

This stearyl ester of polybutadiene, polymeric ester No. 2, is useful as a lubricant is ABS and SAN melts as will be demonstrated below.

EXAMPLE III

A solution of 37 grams of hydroxy terminated poly(butadiene-acrylonitrile) and 6.7 grams of stearyl chloride were dissolved under nitrogen atmosphere in 800 millileters of a 1:1 benzene and toluene mixture. The polymer was a commercial material having a number average molecular weight of about 11,000. 2.5 millileters of pyridine were added to the solution and the esterification reaction provided at 95° C. for 5 hours. The isolation and purification of the stearyl ester of poly(butadiene-acrylonitrile), polymeric ester No. 3, was accomplished as in example I.

A sample of a commercial ABS resin and samples of lubricated ABS resins were prepared for evaluation and comparison of their melt flow properties. A commercial pure high impact grade ABS resin was taken as a standard material. It contained approximately 65 percent by weight acetone extractable styrene-acrylonitrile copolymer. This extractable copolymer portion had a number average molecular weight of about 130,000. To a portion of this resin was added 2.8 percent by weight of a commercial rosin lubricant. The rosin lubricant and ABS resin were mixed on a hot roll mill at approximately 180° C. (356° F.). In a similar fashion varying amounts of the polymeric ester lubricants prepared in example I, example II and example III up to a maximum of about 2.8 percent by weight were added to the ABS resin. The ABS and the lubricant-ABS resin mixtures were heated to 240° C. (464° F.) and the flow properties of the polymer systems were characterized using an Instron Capillary Rheometer. The results of these tests are summarized in the following tables I and II. Table I compares the shear stress in dynes per square centimeter to obtain various shear rates from 15 seconds$^{-1}$ to 1,500 seconds $^{-1}$ for the above-described pure commercial ABS resin, the same ABS resin containing 2.8 percent by weight of a commercial rosin lubricant, the same ABS resin containing 2.8 percent by weight of the polymeric ester prepared in example I and the same ABS resin containing 2.8 percent by weight of the polymeric ester prepared in example III.

TABLE I

| Shear rate (second$^{-1}$) | ABS pure shear stress (dyne/cm.$^2$) | ABS plus 2.8% lub.* shear stress (dyne/cm.$^2$) | ABS plus 2.8% Ester III shear stress (dyne/cm.$^2$) | ABS plus 2.8% Ester I shear stress (dyne/cm.$^2$) |
|---|---|---|---|---|
| 15 | 1.78×10$^6$ | 9.80×10$^5$ | 7.40×10$^5$ | 5.60×10$^5$ |
| 40 | 2.21×10$^6$ | 1.51×10$^6$ | 1.2 ×10$^6$ | 1.02×10$^6$ |
| 70 | 2.50×10$^6$ | 1.90×10$^6$ | 1.51×10$^6$ | 1.34×10$^6$ |
| 100 | 2.72×10$^6$ | 2.13×10$^6$ | 1.72×10$^6$ | 1.58×10$^6$ |
| 200 | 3.11×10$^6$ | 2.60×10$^6$ | 2.20×10$^6$ | 2.09×10$^6$ |
| 400 | 3.51×10$^6$ | 3.05×10$^6$ | 2.78×10$^6$ | 2.63×10$^6$ |
| 700 | 3.81×10$^6$ | 3.40×10$^6$ | 3.20×10$^6$ | 3.18×10$^6$ |
| 1,000 | 4.02×10$^6$ | 3.62×10$^6$ | 3.48×10$^6$ | 3.45×10$^6$ |
| 1,500 | 4.20×10$^6$ | 4.01×10$^6$ | 3.76×10$^6$ | 3.73×10$^6$ |

Temperature—240° C. *Commercially available lubricant.

The data in the above table I illustrates that the shear stress required to achieve a particular shear rate for lubricated samples are uniformly less than the shear stress required to cause pure molten ABS resin to flow. Moreover, the data illustrates that the polymeric esters of the subject invention provide improved lubricity over the commercial rosin lubricant. In each instance, the ABS melts containing the lubricants of examples I and III required markedly less shear stress than that required in the ABS melt containing the commercial rosin lubricant. Like results are obtained when other present commercial lubricants, such as the metal stearates, are employed in ABS resin melts.

TABLE II

| Shear rate (second$^{-1}$) | 0% viscosity (poises) | Ester (I) 0.66% viscosity (poises) | Ester (I) 1.50% viscosity (poises) | Ester (II) 1.50% viscosity (poises) | Ester (I) 2.8% viscosity (poises) | Ester (III) 1.5% viscosity (poises) | Ester (III) 2.8% viscosity (poises) |
|---|---|---|---|---|---|---|---|
| 15 | 1.03×10$^5$ | 8.9×10$^4$ | 6.62×10$^4$ | 6.20×10$^4$ | 3.75×10$^4$ | 8.40×10$^4$ | 4.80×10$^4$ |
| 40 | 5.60×10$^4$ | 4.98×10$^4$ | 3.84×10$^4$ | 3.60×10$^4$ | 2.58×10$^4$ | 4.60×10$^4$ | 2.94×10$^4$ |
| 70 | 3.70×10$^4$ | 3.38×10$^4$ | 2.70×10$^4$ | 2.54×10$^4$ | 1.95×10$^4$ | 3.10×10$^4$ | 2.11×10$_4$ |
| 100 | 2.78×10$^4$ | 2.55×10$^4$ | 2.11×10$^4$ | 2.00×10$^4$ | 1.60×10$^4$ | 2.40×10$^4$ | 1.70×10 |
| 200 | 1.56×10$^4$ | 1.50×10$^4$ | 1.29×10$^4$ | 1.25×10$^4$ | 1.05×10$^4$ | 1.40×10$^4$ | 1.09×10$^4$ |
| 400 | 8.72×10$^3$ | 8.4×10$^3$ | 7.60×10$^3$ | 7.48×10$^3$ | 6.60×10$^3$ | 8.11×10$^3$ | 7.02×10$^3$ |
| 700 | 5.30×10$^3$ | 5.2×10$^3$ | 4.90×10$^3$ | 4.8×10$^3$ | 4.45×10$^3$ | 5.2×10$^3$ | 4.71×10$^3$ |
| 1,000 | 3.84×10$^3$ | 3.70×10$^3$ | 3.62×10$^3$ | 3.58×10$^3$ | 3.45×10$^3$ | 3.80×10$^3$ | 3.56×10$^3$ |
| 1,500 | 2.71×10$^3$ | 2.70×10$^3$ | 2.62×10$^3$ | 2.60×10$^3$ | 2.55×10$^3$ | 2.70×10$^3$ | 2.60×10$^3$ |

Temperature—240° C. (I)—Prepared by Example I. (II)—Prepared by Example II. (III)—Prepared by Example III.

Table II above summarizes viscosity data obtained with melts of the same pure commercial ABS resin together with melts of blends of the pure ABS resin with the indicated amounts of polymeric ester lubricants prepared in examples I, II and III. Here it is shown that polymeric ester lubricant additions in amounts from 0.66 to 2.8 percent markedly reduce the melt viscosity of the ABS resin blends over a wide range of shear rates. In addition to reducing the melt viscosity of the ABS blends it was observed that molded or extruded articles of these blends had improved surface appearance and were readily removed from metallic molds.

To further illustrate the practice of my invention, pure commercial styrene-acrylonitrile copolymer ($\overline{M}_n$ = 78,000) and blends of commercial styrene-acrylonitrile polymer with polymeric ester lubricants (specifically example I) were melted at a temperature of 230° C. and their melt flow properties evaluated using an Instron Capillary Rheometer. The shear stress and the viscosity data for the pure SAN and lubricated SAN blends are summarized in table III below.

TABLE III

| Shear rate (second$^{-1}$) | SAN shear stress (dyne/cm.$^2$) | 1.5% (I) SAN plus lub. shear stress (dyne/cm.$^2$) | SAN viscosity (poises) | 1.5% (I) SAN plus lub. viscosity (poises) |
|---|---|---|---|---|
| 15 | 4.07×10$^5$ | 2.23×10$^5$ | 2.64×10$^4$ | 1.47×10$^4$ |
| 40 | 6.95×10$^5$ | 4.12×10$^5$ | 1.70×10$^4$ | 1.01×10$^4$ |
| 70 | 8.95×10$^5$ | 5.60×10$^5$ | 1.27×10$^4$ | 8.00×10$^3$ |
| 100 | 1.02×10$^6$ | 6.70×10$^5$ | 1.02×10$^4$ | 7.73×10$^3$ |
| 200 | 1.31×10$^6$ | 9.40×10$^5$ | 6.60×10$^3$ | 4.70×10$^3$ |
| 400 | 1.64×10$^6$ | 1.30×10$^6$ | 4.1 ×10$^3$ | 3.2 ×10$^3$ |
| 700 | 1.98×10$^6$ | 1.63×10$^6$ | 2.79×10$^3$ | 2.31×10$^3$ |
| 1,000 | 2.20×10$^6$ | 1.90×10$^6$ | 2.14×10$^3$ | 1.87×10$^3$ |
| 1,500 | 2.47×10$^6$ | 2.20×10$^6$ | 1.59×10$^3$ | 1.43×10$^3$ |
| 2,500 | 2.80×10$^6$ | 2.60×10$^6$ | 1.08×10$^3$ | 1.02×10$^3$ |

Temperature—230° C.

The data in this table III illustrates that the lubricated SAN mixtures have lower viscosity and require lower shear stresses for flow at the respective shear rates than unlubricated materials. It is also found that the polymer-ester lubricants of this invention typically have a greater beneficial effect on the flow properties of SAN polymers than known commercial lubricants, such as rosin or the metallic soaps at the same concentration. As with the ABS resins, it is also observed that the several polymer-ester lubricants have a beneficial effect on the surface of molded or extruded articles and provide useful mold release properties. The stearate and palmitate esters of hydroxy terminated polybutadiene and hydroxy terminated butadiene-acrylonitrile copolymers in accordance with the invention provide advantageous lubricating properties in melts of ABS and SAN resins. These properties are most prominent at relatively low shear rates up to about 1,000 seconds$^{-1}$ to 2,500 seconds$^{-1}$ or less. Accordingly, they are preferred for use in processing operations where the resin melts will be flowing at relatively low shear rates of the magnitude specified.

While my invention has been described in terms of a few specific embodiments thereof, it will be appreciated that other specific forms could readily be adapted by one skilled in the art. Accordingly, the scope of my invention is to be considered limited only by the following claims.

What is claimed is:

1. In the process of forming thermoplastic resins selected from the group consisting of acrylonitrile-butadiene-styrene (ABS) resins and styrene-acrylonitrile (SAN) copolymer resins into useful articles wherein a said resin is melted and caused to flow by a shear force and then cooled and solidified in a predetermined desired shape, the improvement comprising mixing a small amount of polymeric ester with said resin up to about 3 percent by weight of said resin before said resin melt is subjected to said shear force, said polymeric ester being selected from the group consisting of the stearate and palmitate esters of hydroxy terminated polybutadiene and hydroxy terminated butadiene-acrylonitrile copolymer, said polymeric ester acting as lubricant to reduce the viscosity of said resin melt.

2. In the process of forming thermoplastic resins selected from the group consisting of acrylonitrile-butadiene-styrene (ABS) resins and styrene-acrylonitrile (SAN) copolymer resins into useful articles wherein said resin is melted and caused to flow by a shear force and then cooled and solidified in a predetermined desired shape, the improvement comprising mixing a small amount of a polymeric lubricant with said resin up to about 3 percent by weight of said resin before said resin melt is subjected to said shear force, said polymeric lubricant being the stearate ester of hydroxy terminated polybutadiene, said polymeric lubricant acting to reduce the viscosity of said resin melt.

3. In the process of forming thermoplastic resins selected from the group consisting of acrylonitrile-butadiene-styrene (ABS) resins and styrene-acrylonitrile (SAN) copolymer resins into useful articles wherein said resin is melted and caused to flow by a shear force and then cooled and solidified in a predetermined desired shape, the improvement comprising mixing a small amount of a polymeric lubricant with said resin up to about 3 percent by weight of said resin before said resin melt is subjected to said shear force, said polymeric lubricant being the stearate ester of a hydroxy terminated butadiene-acrylonitrile copolymer, said polymeric lubricant acting to reduce the viscosity of said resin melt.

4. In the process of forming acrylonitrile-butadiene-styrene (ABS) resins into useful articles wherein said resin is melted and caused to flow by a shear force at shear rates up to about 1,000 seconds$^{-1}$ to 2,500 seconds$^{-1}$ and then cooled and solidified in a predetermined desired shape, the improvement comprising mixing a small amount of polymeric ester with said resin up to about 3 percent by weight of said resin before said resin melt is subjected to said shear force, said polymeric ester being selected from the group consisting of the stearate and palmitate esters of hydroxy terminated polybutadiene and hydroxy terminated butadiene-acrylonitrile copolymer, said polymeric ester acting as a lubricant to reduce the viscosity of said resin melt.

5. In the process of forming styrene-acrylonitrile (SAN) copolymer resins into useful articles wherein said resin is melted and caused to flow by a shear force at shear rates up to about 1,000 seconds$^{-1}$ to 2,500 seconds$^{-1}$ and then cooled and solidified in a predetermined desired shape, the improvement comprising mixing a small amount of polymeric ester with said resin up to about 3 percent by weight of said resin before said resin melt is subjected to said shear force, said polymeric ester being selected from the group consisting of the stearate and palmitate esters of hydroxy terminated polybutadiene and hydroxy terminated butadiene-acrylonitrile copolyer, said polymeric ester acting as lubricant to reduce the viscosity of said resin melt.

* * * * *